Jan. 15, 1935.  T. B. NISBET  1,988,016
WING SHIELD SUPPORT
Filed June 15, 1932  2 Sheets-Sheet 1
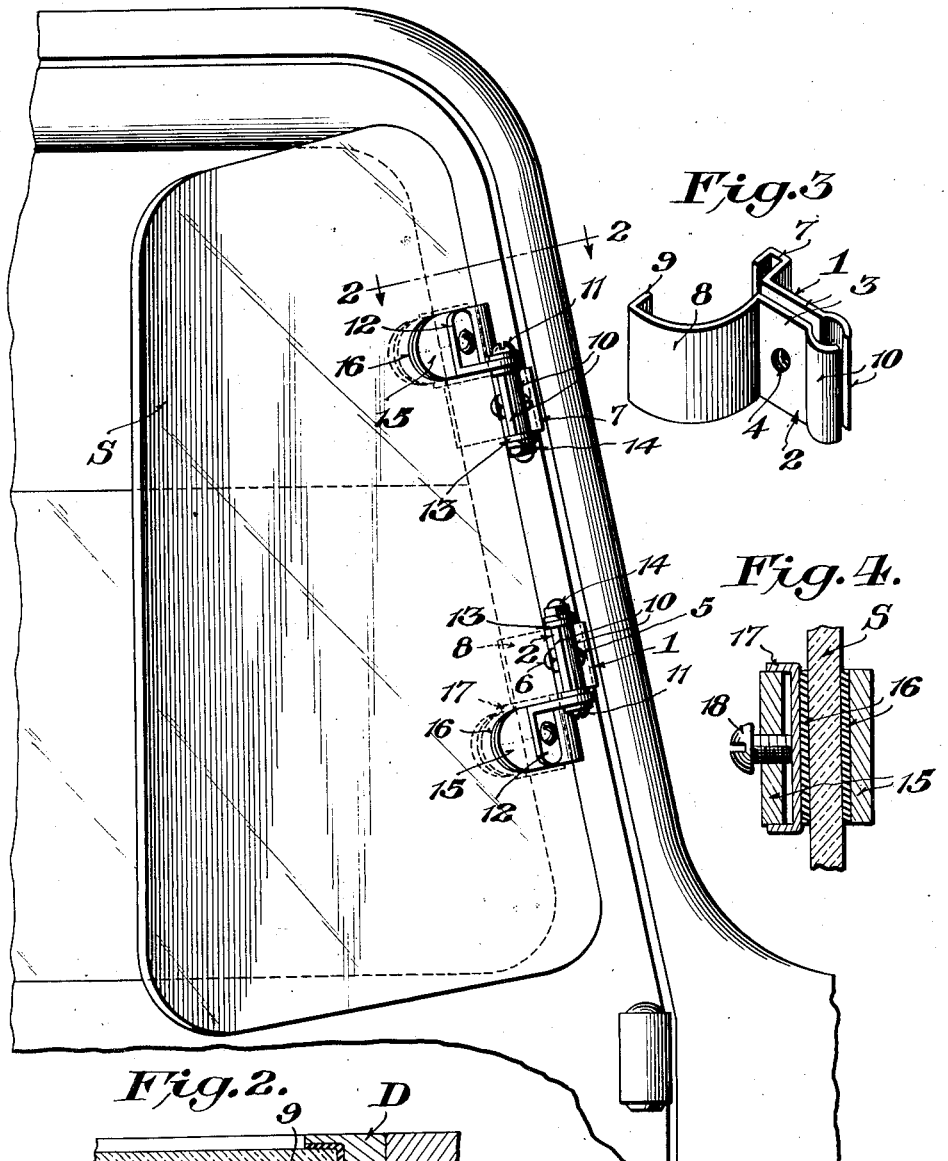
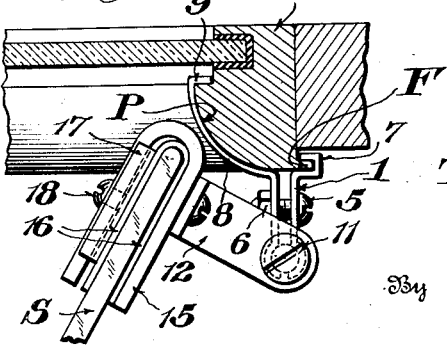
Inventor
Theodore B. Nisbet,
By
Attorney

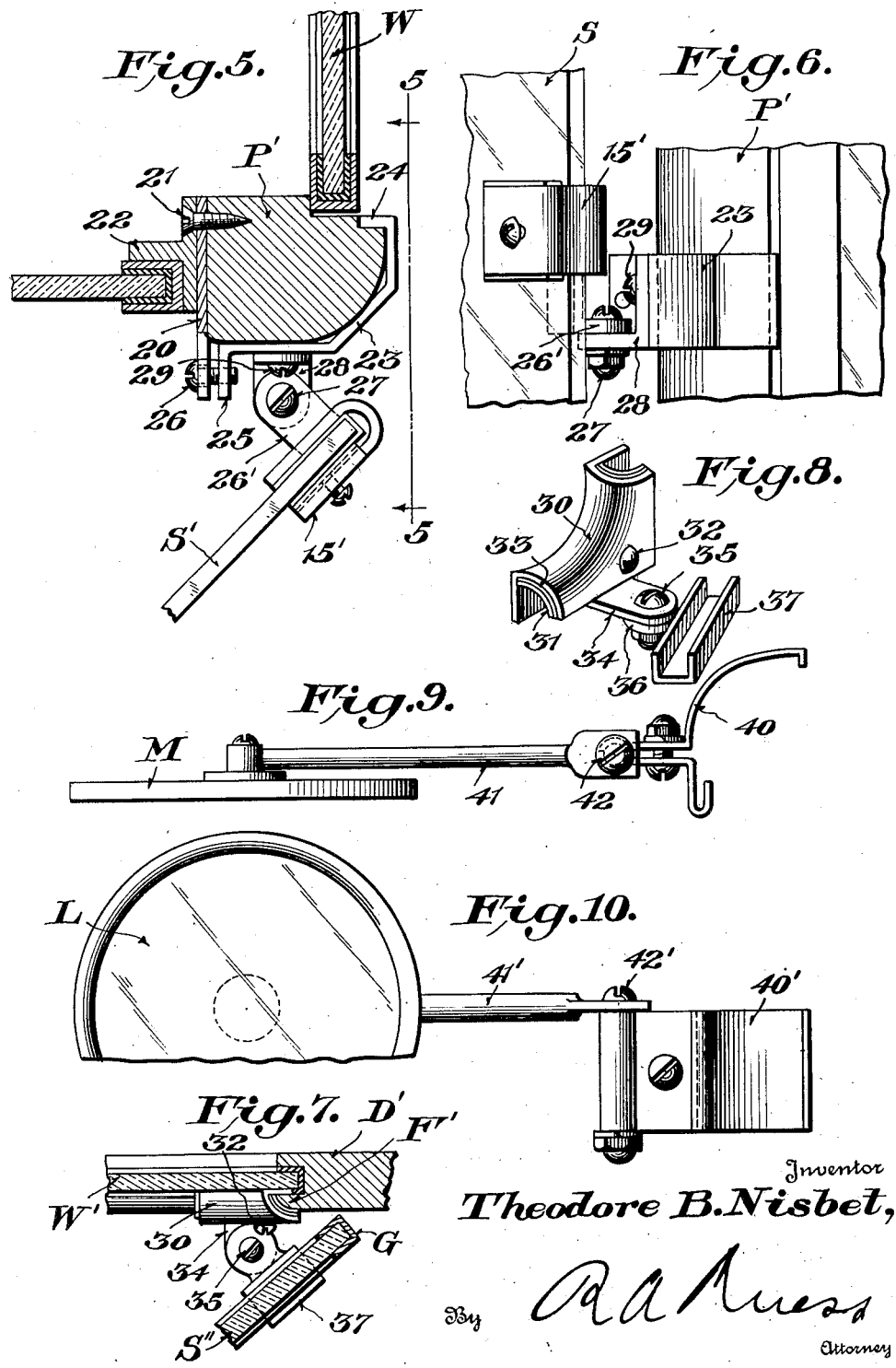

Patented Jan. 15, 1935

1,988,016

UNITED STATES PATENT OFFICE 1,988,016

WING SHIELD SUPPORT

Theodore B. Nisbet, Irvington-on-Hudson, N. Y., assignor to Edward T. Condon, New York, N. Y.

Application June 15, 1932, Serial No. 617,451

3 Claims. (Cl. 296—84)

This invention relates to wing shield supports, and more particularly to means for supporting a shield on passenger vehicles, such as automobiles. The primary object of the invention is to provide supporting means for a shield of this type which can be easily and quickly applied to the body of an automobile or to the door of an automobile without in any manner whatsoever marring or defacing the finish of the latter, and which at the same time is effectively held in position.

A further and important object of the invention is to provide improved means for attaching the glass wing, without the necessity of perforating the latter and at the same time to provide attaching means which is effective for the purpose.

A further object of the invention is to provide means for attaching an automobile accessory to the automobile, by and through friction thereby eliminating perforation of the automobile or any marring or defacing whatsoever of the finish thereof.

Still further the invention aims to provide novel means for attaching an automobile accessory to a wing shield support, without marring, defacing or otherwise altering the latter.

Still further the invention aims to provide means for attaching an automobile accessory such as a wing shield, rear vision mirror, or search lamp, etc., to the latter in a position outwardly thereof, and in one specific aspect for attaching the accessory to the door for movement therewith, so as to not interfere with free swinging of the door.

Still further, the invention aims to provide a device for engagement with the front portion of the door and which is carried by the latter outside of the window and adjacent to the front edge of the latter.

The present day practice, generally speaking, is to employ screws or like fastenings, for securing the shield in position, but this is objectionable, since same results in mutilation of the automobile and consequent marring of the finish. The present invention aims to eliminate this objection and further aims to simplify and improve upon the disclosure in my Patent No. 1,805,341, of May 12, 1931.

The invention has further and other objects which will be later set forth and manifested in the course of the following description.

In the drawings:

Fig. 1 is a side elevation of one form of the invention applied to the door of an automobile the latter shown in fragment;

Fig. 2 is an enlarged section on line 2—2 of Fig. 1;

Fig. 3 is a detail perspective view of the clamp which is attached to the door;

Fig. 4 is a cross section of the glass wing shield attaching means;

Fig. 5 is a section similar to Fig. 2 of a modified form of the invention showing same applied to the windshield post or pillar of a convertible car;

Fig. 6 is a front elevation of Fig. 5 looking in the direction indicated by the line 6—6;

Fig. 7 is a sectional view of a form of the invention, for use with sedans;

Fig. 8 is a perspective view of the form of the invention shown in Fig. 7;

Fig. 9 is a top plan view of the form of the invention shown in Figs. 1 to 3 illustrating the device employed to support a rear vision mirror; and Fig. 10 is a front elevation of the form of the invention shown in Fig. 9 but used in connection with a search lamp, in place of a mirror.

In proceeding in accordance with the present invention a pair of clamps or clips are employed for each shield, each consisting of a pair of jaws 1 and 2 which latter have intermediate parallel portions 3 perforated at 4 to receive an attaching bolt 5, the latter provided with a nut 6. The jaw 1 is provided with a hook-like lip 7 at one end which is formed to engage about the usual flange F at the front of an automobile door D. The jaw 2 is formed with a curved end 8 terminating in an inwardly extending flange 9, the jaw and flange engaging over the curved edge of the post P at the front side of the door. The opposite ends of the jaws 1 and 2 are formed with similar or complementary curved terminals 10 and engage about or embrace a hinge pintle 11 and are secured thereto by the bolt 5 which latter also secures the clip to the post of the door. The hinge pintle 11 is secured to one arm 12 of a substantially L-shaped support, and depends therefrom. A washer 13 and a nut 14 are applied to the lower end of the pintle 11, the washer engaging the lower ends of the curved terminals 10 of the jaws 1 and 2 and being frictionally held against the lower ends of said terminals by means of the nut 14.

The glass wing shield S is attached in position by means of substantially U-shaped clamps 15 which latter embrace the opposite faces and extend over the forward edge of the shield, there being a cushioning member of U-shape within the clamp which may be formed of a rubber strip or other material and which engages against the opposite faces of the glass. A substantially U-shaped movable jaw 17 is movably mounted on one side of the clamp 15 and is adjustably held by means of a screw 18 which latter is threaded through said side of the clamp and has its free edge impinged against the jaw 17 whereby it will be seen that the clamp is rigidly held in position by the jaw and the opposed side of the clamp and without the necessity of boring holes through or otherwise altering the glass S.

From the foregoing it will be seen that the device can be easily and quickly attached to the door without marring or defacing or in any way altering the door structure, and likewise easily and quickly attached to the glass wing shield.

In the form of the invention depicted in Figs. 5 and 6, there is illustrated the usual pillar or post P' for the windshield W of a convertible automobile. In this form of the invention a clip is employed which consists of a plate 20 attached to the rear side face of the post by means of the screw 21 which latter is ordinarily employed to secure the channel member 22 to the post. However, the plate 20 may be secured by other means. The clip is further formed with a jaw 23 having an inturned flange 24 which engages the inner front corner of the pillar and further has an out-turned flange 25 which abuts the plate 20 and is secured thereto by means of a screw 26. The clamp 15' for the glass wing S' is identical with that shown in Figs. 1, 2, and 4, and is provided with a lateral lug 26' which is pivotally secured by means of a bolt 27 to an L-shaped clip 28 one arm of which latter is secured by a screw 29 to the jaw 23.

In use of this form of the invention it is merely necessary to remove the screws 21 and the channel strip 22 following which the plate 20 is then applied in position, the channel superimposed thereupon as shown, and finally the screws 21 reapplied whereby the latter simultaneously secure the plate and the channel in position. It will, of course be understood, that the thickness of the plate 20 is such so as not to cause binding of the window in raising and lowering of the latter.

In the form of the invention depicted in Figs. 7 and 8, which is for use with standard sedan types, a curved clip 30 of substantially U-shape in cross section is employed and is lined with a packing 31 to engage about the flange F' of the door D' so that same is partially disposed within the usual channel for the window W' of the sedan. The clip 30 is held in position by means of a screw 32 which bears against a curved plate 33 so that the screw 32 will not cut into the felt and the latter will be uniformly engaged with the flange F' thus effectively securing the clip in position. The clip is provided with an outwardly extending ear 34 which is pivoted by means of a bolt 35 to a lug 36 carried by a channel member 37, the latter receiving the glass wing S'' therein which latter may be welded onto or otherwise suitably secured to the frame G of the glass wing S''. The clip it will be understood is received in the curved corner at the front of the frame of the door, and is of such thickness so as to not interfere with free movement of the window.

In Fig. 9 I have shown a clip 40 which is identical with that shown in Fig. 3, but in this form of the invention a rod 41 is employed and which is secured by a bolt 42 to the clip 40, the outer end of the rod carrying a rear vision mirror M. In this use of the invention the arm projects laterally from the automobile body. In Fig. 10 is illustrated a clip 40' having a rod 41' secured thereto by means of a bolt 42', the rod at its outer end being suitably connected to a search lamp L.

Obviously, the clips of Figs. 5 and 7 are equally applicable for use with mirrors or search lamps, as illustrated in connection with the clips shown in Figs. 9 and 10.

It will also be obvious that the clips, particularly as shown in Fig. 3, can be shaped so as to be attached to conform same to the end posts of tonneau or the front windshields of open or convertible automobiles, the shape of course being dependent upon the make of the automobile.

Obviously also, various other changes in construction can be made, the disclosure being by way of example and not exhaustive enumeration of all ways in which the invention can be practised within the scope and spirit announced by the following claims:

What is claimed, is:

1. In a wing shield support, a pair of clips, formed to engage with the front door post of an automobile, one of the clips having inwardly extending flange and the other a lip to engage about the usual flange of the front door post, said clips having substantially parallel portions which in operative position extend outwardly from the door at substantially right angles thereto, a vertically disposed hinge pintle, the outer ends of said parallel portions having similar complementary curved terminals which embrace opposite sides of the pintle, a bolt extending through the parallel portions between their ends to clamp the terminals to the pintle, and means to connect the pintle to the shield.

2. A wing shield support in accordance with claim 1, wherein the means to connect the pintle to the shield includes an arm which is carried by the shield and has an opening through which the pintle passes and which abuts one of the side edges of each of the complementary terminals, and means carried by the pintle to clamp said arm against said edges of the complementary terminals.

3. In a wing shield support, a pair of clips each having one of their end portions engaged with the front door post of an automobile and with the usual flange of the post respectively, said clips having their opposite ends formed with complementary curved terminals, a vertically disposed hinge pintle embraced on its opposite sides by the terminals, means between the ends of the clips to clamp the terminals to the pintle, a clamp connected to the shield to support the latter, an arm secured to the clamp and having an opening to receive the pintle and abutting one of the side edges of each of the terminals, and means carried by the pintle to clamp said arm against said side edges of the terminals.

THEODORE B. NISBET.